April 25, 1961
T. A. O. GROSS
2,981,942
PULSE ECHO SYSTEMS
Filed Jan. 23, 1952
3 Sheets-Sheet 1
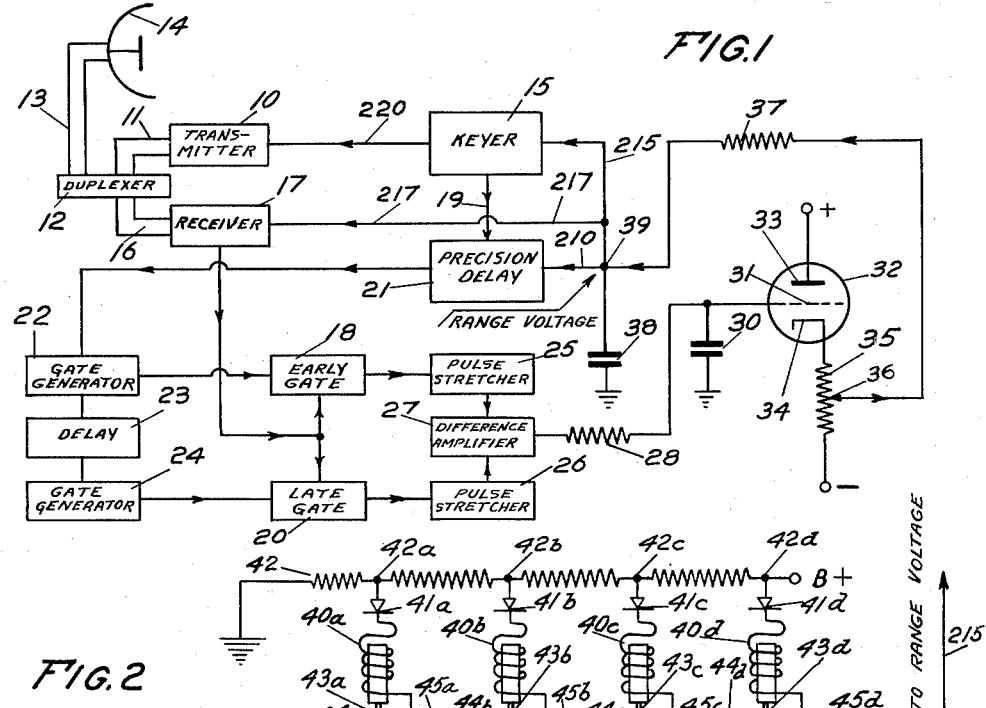
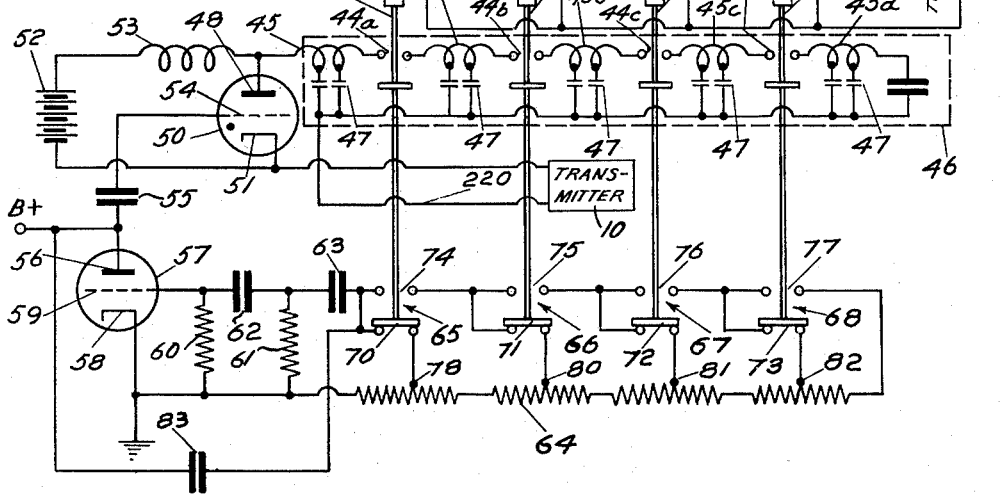
INVENTOR
THOMAS A. O. GROSS
BY Elmer J. Gorn
ATTORNEY

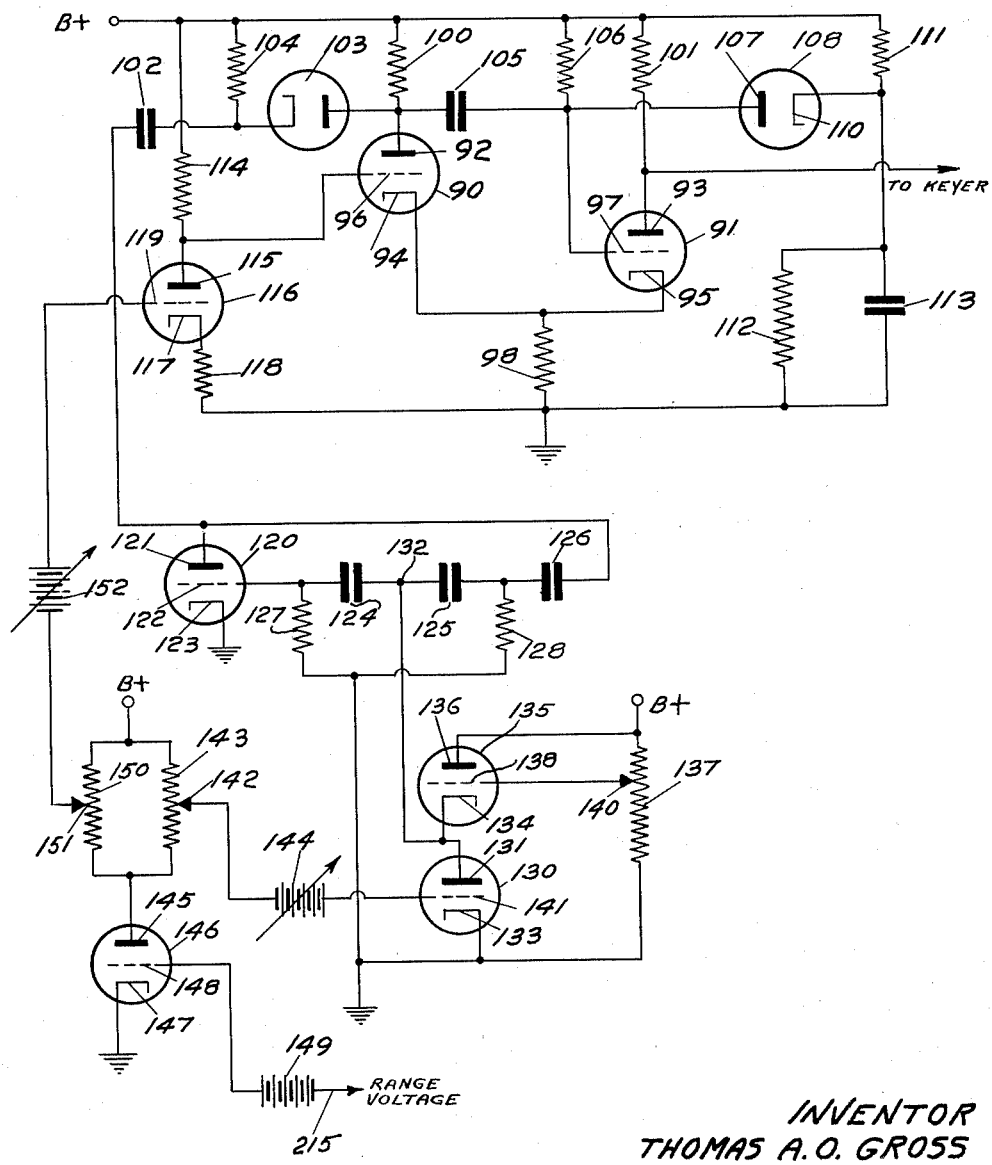

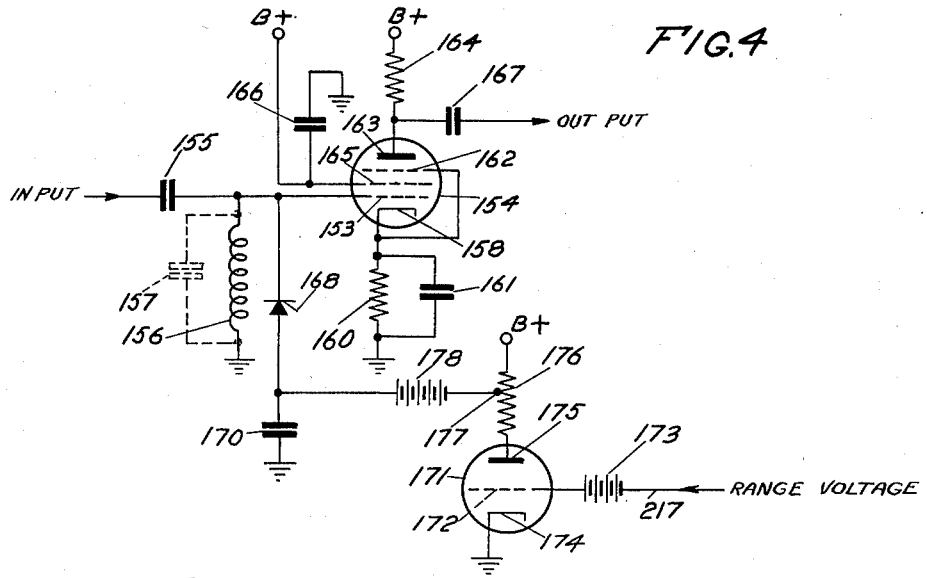
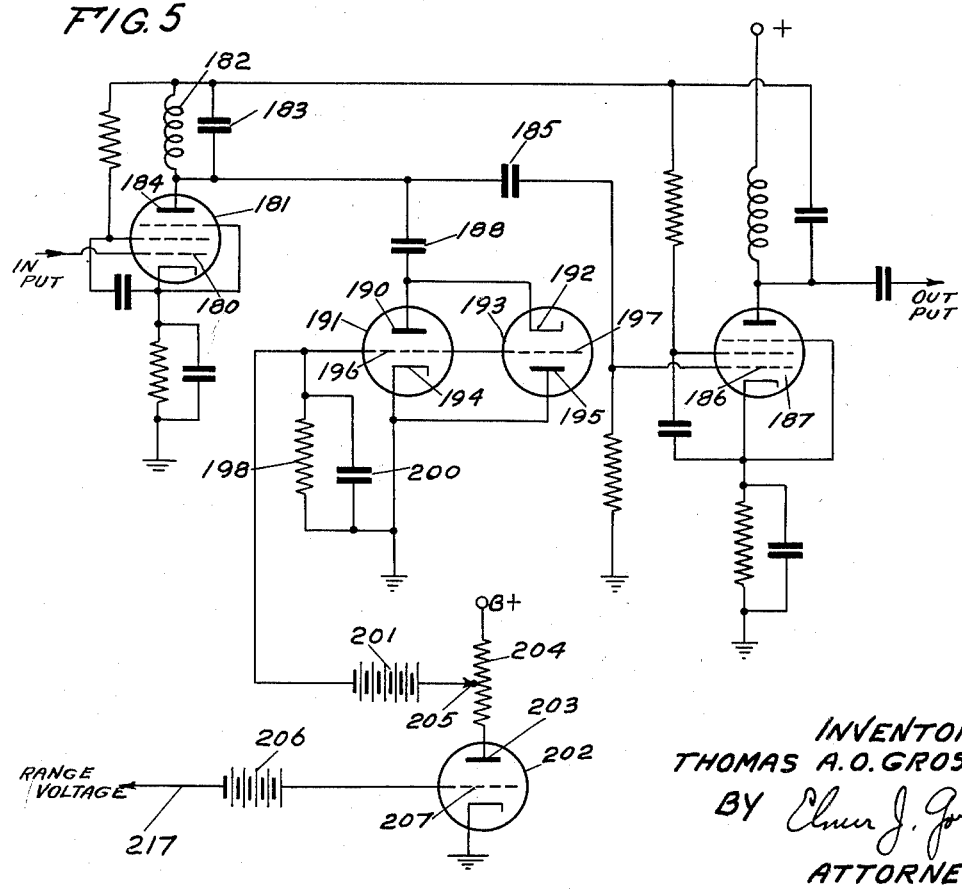

United States Patent Office 2,981,942
Patented Apr. 25, 1961

2,981,942
PULSE ECHO SYSTEMS

Thomas A. O. Gross, South Lincoln, Mass., assignor to Raytheon Company, a corporation of Delaware Filed Jan. 23, 1952, Ser. No. 267,811

14 Claims. (Cl. 343—7)

This invention relates to pulse echo distance measuring equipment and more particularly to systems wherein the distance to an object is represented by a voltage that is utilized to vary the width of the pulses directly with the distance to the object and their repetition rate inversely with distance to permit a relatively constant average power output and to vary the band width of the tuned circuits of the receiver inversely with distance to maintain optimum receiving conditions at all times.

In pulse radar systems, the choice of the transmitter pulse length is a compromise between the conflicting requirements for the detection of as small a difference in range as possible and for the detection of as distant an object as possible. In order for the equipment to detect small differences in range and to detect objects at close range, the pulses should be short. However, such short pulses contain a limited amount of energy, while as much energy as possible is needed for maximum range. This additional pulse energy can be obtained by using longer pulses.

The selection of a pulse repetition rate raises a similar problem and must also be a compromise in most cases. For long range use it is necessary to keep the repetition rate sufficiently low to allow the echo of one pulse to be received before the next is transmitted in order to prevent confusion between the signals. At short range many targets, such as airplanes and ships, are likely to be changing their positions relative to the radar very rapidly. Thus, a high pulse repetition rate is desirable.

Another consideration is the desirability of maintaining the average power produced by the transmitter constant. This average power is a function, among other things, of the pulse duration and repetition rate. As pointed out above, it is desirable to have the pulse duration long under the same conditions that make it desirable to have the repetition rate low and, conversely, the pulse duration short under the same conditions where the repetition rate should be high. Thus, if the pulse duration and repetition rate are changed in accordance with the range of the detected target to keep them always near the optimum, the average power will tend to remain the same. While both pulse duration and repetition rate may be varied by the use of manual controls, it is not possible to maintain them always at the optimum values by these means. For this reason, it is desirable to have an automatic method of controlling these parameters of the transmitted pulses.

The parameters for optimum operation of the receiver also vary with range. This applies particularly to bandwidth and sensitivity. When the distance to the target is short the reflected signal will be strong so that the receiver need not be at its maximum sensitivity. However, the pulses will be of short duration and closely spaced so that a broad bandwidth will be required to give good resolution. However, sensitivity can be exchanged for bandwidth at short range. At longer range, signals will be weaker and greater sensitivity is required to receive them, but as the pulses will be of greater duration and at a lower repetition rate a lower bandwidth will suffice to receive them. Thus it is desirable to have a means for automatically narrowing the bandwidth and increasing the sensitivity of the receiver as the range of the target increases. This is also provided by the present invention.

In automatic ranging radar, a D.C. voltage is produced that is proportional to range. By the present invention, this voltage is utilized to vary the pulse duration and the repetition rate of the pulses. The pulse duration can be continuously so varied in the multivibrator type of modulator by substituting the plate to cathode path of a triode vacuum tube for the pulse width determining impedance of the multivibrator and controlling the conductance of this path by the application of the range voltage to the grid of this triode. The pulse duration of a line type modulator may be varied in a step-by-step manner by means of relays energized by the voltage to switch in additional sections of the pulse width determining line as the range voltage reaches successively higher values. A similar relay system can be used to switch in and out additional impedances in the pulse width determining section of a multivibrator type of modulator.

The pulse repetition rate of a modulator using a resistor capacitor type oscillator to generate the basic triggering pulses can be determined by substituting a triode for one of the frequency determining resistors in the oscillator circuit and applying the range voltage to the grid of the triode to control its conductance and thus the frequency of the modulator ouput. This can also be done by using a train of relays energized by the range voltage to insert additional impedances into the frequency determining circuit of the oscillator.

The bandwidth of the receiver can be decreased and its sensitivity increased by shunting one or more of the tuned circuits of the receiver with rectifiers that are arranged to conduct only when the range voltage is low. A triode can be substituted for the rectifier and its grid supplied with the range voltage through a phase inverter to obtain a voltage inversely proportional to range.

Other and further objects of this invention will be apparent as the description thereof progresses, reference being had to the accompanying drawings wherein:

Fig. 1 is a block diagram of an automatic ranging radar embodying the invention;

Fig. 2 is a schematic diagram of one embodiment of the invention;

Fig. 3 is a schematic diagram of another embodiment of the invention;

Fig. 4 is a schematic diagram of a circuit utilizing the range voltage to narrow the band width of the receiver as the range of the target is increased; and Fig. 5 is a schematic diagram of a modified circuit for narrowing the band width of the receiver.

In Fig. 1 the reference numeral 10 refers to a pulse type radar transmitter which feeds energy through a wave guide 11, a duplexer 12 and a wave guide 13 to an antenna 14. The transmitter 10 is pulsed periodically by a keyer or modulator 15 which produces periodic trigger pulses in a well-known manner. The pulsed energy, which may be, for example, within the radar frequency, high frequency or microwave spectrum, is radiated from antenna 14 and strikes an object which reflects energy pulses back to the antenna 14 in a well-known manner. These pulses are fed from the antenna 14 through the wave guide 13, the duplexer 12 and a wave guide 16 to a receiver 17 which may be of any desired type and may comprise, for example, RF and IF amplifiers and a detector. The output of receiver 17 comprises a video signal derived from the signal pulses reflected from the object. The video signal is fed through a pair of coincidence gates 18 and 20. These gates may be of any desired type such as, for example, pentodes. The video signal being fed to the grids thereof, and the output being derived from the plate circuits attached to the pentodes, said pentodes being rendered conductive and nonconductive by suitable pulses applied, for example, to the screen or suppressor grids thereof to produce the gating action in a well-known manner, as shown in Fig. 10.16 and described on page 379 of "Waveforms" by Chance, Hughes, McNichols, Sayre and Williams, vol. 19 of the Radiation Laboratory Series. In this case the signal from the receiver 17 is applied to the grid and the gating pulse obtained in a manner to be described is applied to the suppressor grid. The grid is biased to a point where the gate tube will not conduct when the signal from the receiver appears on the grid unless a gating pulse also appears at the screen grid. Thus the video information can only appear at the output, here the plate of the pentode, when the gating pulse appears at the suppressor grid.

The pulses which open the gates may be produced, for example, as follows: A precision delay circuit 21 is fed a trigger pulse from keyer 15 over line 19 every time the transmitter is pulsed. This pulse is delayed for a predetermined amount of time by circuit 21, the delay being determined by a potential applied to one of the electrodes in this circuit. A circuit suitable for such use is the so-called phantastron circuit. A suitable phantastron circuit is more completely described on page 197 of cited volume entitled "Waveforms." By varying the potential applied to the plate of the pentode in this circuit, the delay may be decreased or increased as desired. The triggering pulse is applied over line 19 to the suppressor grid of the pentode. The delayed trigger pulse is fed to a gate generator 22 which may be, for example, a gaseous discharge device with associated circuits which produce rectangular pulses of a predetermined duration, for example, a fraction of a microsecond. In such a circuit the trigger pulse is applied to the grid of the gas tube and the output taken from across the cathode resistor. The output of the gate generator 22 is fed to the first of the coincidence gates 18 which may be termed the early coincidence gate. The pulse output of the gate generator 22 is also fed through a delay line 23 of short time duration, for example, a fraction of a microsecond to a second gate generator 24 similar to gate generator 22. The output of gate generator 24, which is a rectangular pulse, is used to gate the coincidence gate 20 which may be termed the late coincidence gate. The outputs of gates 18 and 20 are fed respectively through pulse stretchers 25 and 26 to a difference amplifier 27. Pulse stretchers 25 and 26 may be, for example, simple peak detectors with filter circuits attached to the outputs thereof, such as the circuit shown in Fig. 14.2 and described on page 503 of the cited volume on "Waveforms." These circuits tend to smooth out the pulses produced by the gates 18 and 20 and applied through a diode to the filter circuit into substantially continuously varying direct current potentials appearing across the filter. The difference amplifier in effect subtracts one signal amplitude from the other and amplifies the difference. It may be, for example, a pair of tubes connected in series between a source of negative potential and a source of positive potential with the input signal from gate 18 fed to one grid, and the signal from gate 20 fed to the other grid. The output signal is taken from the junction of the cathode of one of the tubes and the plate of the other tube. Such a circuit is shown in Fig. 14.34 and described on page 530 of the volume on "Waveforms" cited above except that in this case the diodes and coupling capacitors would not be needed.

As shown in Fig. 1 the output of the difference amplifier 27 is fed through an integrating circuit comprising a resistor 28 and capacitor 30 to the grid 31 of a cathode follower 32, the plate 33 of which is connected to a source of positive potential and the cathode 34 of which is connected to a source of negative potential through a potentiometer 35. The arm 36 of this potentiometer is connected through a second integrating circuit comprising a resistor 37 and a capacitor 38 to the precision delay circuit 21 over a line 210, the receiver 17 over a line 217 and the keyer 15 over a line 215.

In operation when the equipment is first turned on there will be no signal at the point 39, and the precision delay circuit will be operating at its minimum value and so will the gate generators 22 and 24. When a reflected signal is received it will appear in the output of one gate or the other, or in greater strength in the output of one gate than the other, or in equal strengths in the outputs of both gates depending upon the range of the target. If it appears most strongly in the output of one gate, say the early gate 18, the output of the difference amplifier 27 will be of one polarity, while if it is strongest in the late gate 20 the output of the difference amplifier 27 will be of the opposite polarity. After passing through the integrating circuits this voltage will appear at the point 39 and the input of the precision delay 21 to readjust the phase of its output so that the early and late gating pulses will bracket the received pulse and produce no signal in the output of the difference amplifier 27. Thus the voltage appearing at the point 39 is proportional to the distance to the target.

This voltage appearing across the capacitor 38 at a point 39 is utilized in circuits such as those shown in Figs. 2 and 3 to vary the pulse duration and pulse repetition rate of the keyer 15. In the circuit shown in Fig. 2, this voltage is used to change the pulse duration in a step-by-step manner by inserting additional sections into an artificial delay line. This is done by applying the voltage to one end of each of the coils 40a, b, c and d. Each coil 40 is connected at its other end through a rectifier 41a, b, c, or d to a tap 42a, b, c or d on a voltage divider 42 connected between a source of positive potential and ground. Each of the coils 40a, b, c, and d controls an operator 43a, b, c or d that, in turn, operates a set of normally opened contacts 44a, b, c, and d. These contacts are connected in series with the inductive sections 45a, b, c, and d of the artificial delay line 46 shunted by capacitors 47. This delay line forms the pulse duration determining circuit of a line type pulser, the greater the number of sections the greater the pulse duration. One end of this delay line 46 is connected to the plate 48 of a grid-controlled gas tube or thyratron 50, the cathode 51 of which is connected to ground. The plate 48 is also connected to a source 52 of positive potential through a choke 53. The thyratron 50 acts as a switch. When it is off the line 46 charges from the source 52 through the choke 53. When it is conducting the line 46 discharges through the transmitter circuits 10 which comprise a pulse transformer, a damping circuit and an oscillator tube such as a magnetron. The thyratron 50 is triggered on by pulses applied at its grid 54. Such a pulser is described more fully at page 374 of vol. 1 of the Radiation Laboratory Series entitled "Radar System Engineering" by Ridenour.

The triggering pulses for this circuit are generated in an audio oscillator shown in the lower part of Fig. 2 and applied to the grid 54 of the thyratron 50 through a capacitor 55 from the plate 56 of an oscillator tube 57, the cathode 58 of which is connected to ground. The grid 59 of this tube 57 is connected to ground through a resistor capacitor network that determines the pulse repetition rate and comprises shunt resistors 60 and 61 and series capacitors 62 and 63. In addition, a tapped resistor 64 has its various taps connected to capacitor 63 by means of an additional set of contacts 65, 66, 67 and 68. These contacts each comprise a set of normally closed contacts 70, 71, 72 and 73 and a set of normally open contacts 74, 75, 76 and 77. The normally closed contacts 70 are connected to the capacitor 63 and a tap 78 on the resistor 64. The normally opened contact 74 connects the capacitor 63 through the normally closed contacts 71 to a tap 80. Similarly the normally opened contacts 75 connect the capacitor 63 to a tap 81 over normally closed contacts 72, and the normally open contacts 76 connect the capacitor 63 to a tap 82 over normally closed contacts 73, while the normally open contacts 77 connect the capacitor 63 to the end of the resistor 64. The capacitor 63 is also coupled through a capacitor 83 to the plate 56 of the oscillator tube 57.

In operation as the range voltage at the point 39 of Fig. 1 increases with the range of the target as explained in connection with Fig. 1, the voltage at the lower end of the relay coils 40 increases. When the voltage at the lower end of coil 40a has reached a level sufficiently higher than the potential at the associated point 42a of the voltage divider 42 to permit the rectifier 41a to conduct, the coil will be energized. As the range voltage increases, successive rectifiers 41b, c, and d will conduct energizing coils 40b, c, and d. When the coil 40a energizes, it closes normally open contacts 44a connecting in a second section of delay line 45a. As coils 40b, c, and d energize, they close their associated normally open contacts 43b, c, and d and add the associated sections 45b, c, and d to the delay line. This addition of sections to the delay line 46 increases the pulse duration as explained above.

When the relay coil 40a is energized the contacts 65 will also operate opening normally closed contacts 70 and closing normally open contacts 74. This has the effect of adding that part of the resistor 64 between the taps 78 and 80 to the frequency determining network of the oscillator 57 over normally open contacts 74 now closed and normally closed contacts 71. Similarly when the coil 40b is energized, contacts 66 will operate to add the section of resistor 64 between the taps 80 and 81 to the network over normally open contacts 74 and 75 now closed, and normally closed contacts 72, reducing the repetition rate of the oscillator 56 still further. Similarly, contacts 67 and 68 bring in the sections between taps 81 and 82 and the balance of the resistor 64, respectively, over normally open contacts 74, 75, 76 and 77 and normally closed contacts 73.

Thus, the desired result of automatically increasing the duration of the pulses and decreasing their repetition rate as the distance to the target increases is obtained. It will be noted that by the circuits described, this has been done in steps.

Fig. 3 shows how the same result may be achieved in a continuous manner. For this purpose a multivibrator is used to generate the keying pulses as the output of such a circuit may be more easily varied continuously in pulse length. Essentially, this is the basic cathode coupled monostable multivibrator shown in Fig. 5.12 at page 170 of "Waveforms," the book cited above, modified by the substitution of a triode with the range voltage applied to its grid in place of the potentiometer. A pair of triodes 90 and 91 each has a plate 92 and 93, respectively, a cathode 94 and 95 and a grid 96 and 97, respectively. The cathodes 94 and 95 are connected to ground through a common resistor 98. The plates 92 and 93 are each connected to a source of positive potential through a resistor 100 or 101. Incoming triggering pulses are applied to the plate 92 through a capacitor 102 and a diode 103. The cathode of the diode 103 is connected to a source of positive potential through a resistor 104. The plate 92 is also coupled to the grid 97 of triode 91 through a capacitor 105. The grid 97 is also connected to a source of positive potential through a resistor 106 and to the plate 107 of a second diode 108. The cathode 110 of the diode 108 is connected to a source of positive potential through a resistor 111 and to ground through a resistor 112, shunted by a capacitor 113. The grid 96 of the tube 90 is connected to a source of positive potential through a resistor 114 and to the plate 115 of a triode 116. The cathode 117 of this triode is connected to ground through a resistor 118. The grid 119 of this triode 116 is supplied with a negative-going voltage proportional to the range voltage obtained from a source such as point 39 in Fig. 1.

The triggering voltage for the multivibrator, just described, is generated by a resistance capacitor oscillator associated with a triode 120 having a plate 121, a grid 122 and a cathode 123. The plate 121 is coupled to the plate 92 of the triode 90 through the diode 103 and the capacitor 102. The cathode 123 is connected directly to ground. The frequency determining resistance capacity network comprising series connected capacitors 124, 125 and 126 and shunt resistors 127 and 128 is connected between the grid 122 and ground. A triode 130 has its plate 131 connected to a point 132 between the capacitors 124 and 125 and its cathode 133 connected to ground. The plate 131 is connected to the cathode 134 of a triode 135 having a plate 136 connected to a source of positive potential and to one end of a resistor 137, the other end of which is connected to ground. The grid 138 of the tube 135 is connected to a tap 140 on the resistor 137. The grid 141 of the triode 130 is connected to a tap 142 on a potentiometer 143 through a variable source of negative potential 144. The potentiometer 143 is connected in series between a source of positive potential and the plate 145 of a triode 146. The cathode 147 of the triode 146 is connected to ground. The grid 148 of the triode 146 is connected to the source of range voltage such as the point 39 of Fig. 1 over a line 215 through a source 149 of negative potential. A second potentiometer 150 is connected in parallel with the potentiometer 143. The tap 151 of the potentiometer 150 is connected to grid 119 of the triode 116 through a variable source of negative potential 152. The output of a circuit such as that shown in Fig. 3 can best be used as a driver for a hard-tube pulser such as that shown in Fig. 10.31 and described at page 367 of vol. 1 of the Radiation Laboratory Series entitled "Radar System Engineering" by Ridenour.

In operation, as the range voltage increases the potential on the grid 148 of the triode 146 rises from an initial negative value toward ground potential. The potential at each of the taps 142 and 151 on the potentiometers 143 and 150 drops, applying a less positive potential to the grids 119 and 141 of the triodes 116 and 130, respectively. This effectively increases the impedance between the plate 115 and the cathode 117 of the tube 116, and also that between the plate 131 and the cathode 133 of the tube 130. In the case of the tube 116, this has the effect of increasing the pulse duration determining impedance of the multivibrator shown in the upper part of Fig. 3, as the pulse duration is directly proportional to this impedance. Similarly, in the case of tube 130 this has the effect of reducing the repetition rate of the audio oscillator shown in the lower portion of Fig. 3, as the pulse repetition rate is inversely proportional to the resistance in this circuit.

Thus, the pulse repetition rate is automatically reduced and the pulse duration automatically increased as the distance to the target increases so that the transmitter is always operating at the most efficient pulse rate and pulse duration.

It has been pointed out above that it is desirable to narrow the bandwidth of the receiver as the range of the target is increased. This can be done under control of the range voltage by either of the circuits shown in Figs. 4 and 5. The circuit of Fig. 4 represents one stage of the receiver 17 of Fig. 1. The incoming signal is applied to the grid 153 of a pentode 154 through a capacitor 155 across a parallel resonant circuit comprising an inductance 156 and the stray capacity of the circuit represented by the dotted capacitor 157. The cathode 158 is connected to ground through a resistor 160 shunted by a capacitor 161. The suppressor grid 162 is connected to the cathode 158. The plate 163 is connected to a source of positive potential through a resistor 164. The screen grid 165 is connected directly to a source of positive potential and to ground through a capacitor 166. The output is taken from the plate 163 through a capacitor 167. The resonant circuit 156—157 is shunted by a rectifier 168 which may most conveniently be a semi-conductor, such as a germanium crystal, connected in series with a capacitor 170 to ground. The range voltage from a source such as the point 39 in Fig. 1 is applied to the capacitor end of the rectifier 168 through a phase inverting tube 171. The grid 172 of this tube 171 is connected to the source of range voltage over a line 217 through a source of negative potential 173. The cathode 174 of the tube 171 is connected to ground. The plate 175 is connected to a source of positive potential through a resistor 176. A tap 177 on this resistor is connected through a source of negative potential 178 to the capacitor side of the rectifier 168.

In operation the rising range voltage appears at the rectifier 168 as a negative-going voltage after passing through the phase inverted tube 171. At its maximum value, it serves to establish a conducting potential across the rectifier effectively shunting the input resonant circuit 156—157 of the tube 154, widening its bandwidth but reducing its sensitivity at this short range. As the range increases, the voltage appearing across the capacitor 170 decreases and the rectifier conducts less current effectively narrowing the bandwith of the input circuit 156—157 on the tube 154 thus narrowing the bandwidth of the receiver while increasing its sensitivity, the desired result.

The same result can be obtained by the use of one or a pair of triodes instead of the rectifier in the circuit shown in Fig. 5. The input signal is applied to the grid 180 of a pentode 181 connected as a tuned plate amplifier having a parallel resonance circuit comprising an inductor 182 and a capacitor 183 connected to the plate 184 which is also coupled through a capacitor 185 to the grid 186 of a pentode 187, also connected as a tuned plate amplifier. The plate 184 of the tube 181 is also connected through a capacitor 188 to the plate 190 of a triode 191 and to the cathode 192 of a triode 193. The cathode 194 of triode 191 and the plate 195 are connected together and to ground. This places the plate to cathode paths of the triodes 191 and 193 in shunt with the tuned circuit 182—183. The conductance of these paths is controlled by the potential applied to the grids 196 and 197 of the triodes 191 and 193, respectively. These grids 196 and 197 are connected to one end of a resistor 198, the other end of which is connected to ground. A capacitor 200 is connected across the resistor 198. The grids 196 and 197 are connected through a source 201 of negative potential to a phase inverted tube 202. The plate 203 of this tube is connected to a source of positive potential through a resistor 204. The grid 196 is connected to a tap 205 on this resistor 204. A voltage proportional to range obtained from a source such as the point 39 of Fig. 1 is applied over line 217 through source of negative potential 206 to the grid 207 of the tube 202.

In operation with a target at minimum the range voltage applied to the grids 196 and 197 of the triodes 191 and 193 is at its most positive value and the triodes 191 and 193 conduct, which causes the bandwidth of the resonant circuit 182—183 to be at its widest, and the sensitivity of the receiver at its lowest. As the range increases, the voltage applied to the grids 196 and 197 becomes less positive and the tubes 191 and 193 conduct less. This narrows the bandwidth of the tuned circuit 182—183 and increases the sensitivity of the receiver. Thus the bandwidth of the receiver is decreased with increasing range while the sensitivity is increased.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A pulse echo system including a transmitter, a receiver producing a voltage proportional to the distance traversed by the signals, means under control of said voltage to modulate the output of said transmitter with pulses of a duration directly proportional to the said voltage and of a repetition rate inversely proportional to the said voltage, and means under control of said voltage to maintain the bandwidth of the receiver inversely proportional to the said voltage.

2. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, means under control of said voltage to maintain the duration of the transmitted pulses directly proportional to the said voltage, means under control of said voltage to maintain the repetition rate of said pulses inversely proportional to the said voltage, and means under control of the said voltage to maintain the bandwidth of the receiver inversely proportional to the said voltage.

3. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, said proportional voltage producing means comprising means for comparing pulses from said transmitter with the output of the receiver, and means for integrating the output of said comparing means twice, means under control of said voltage to maintain the duration of the transmitted pulses directly proportional to the said voltage, means under control of said voltage to maintain the repetition rate of the pulses inversely proportional to the said voltage, and means under control of the said voltage to maintain the bandwidth of the receiver inversely proportional to the said voltage.

4. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, means under control of said voltage to maintain the duration of the transmitted pulses directly proportional to the said voltage, said pulse duration control means comprising means for varying the pulse duration determining impedance of the pulse generating means under control of said voltage, means under control of said voltage to maintain the repetition rate of the pulses inversely proportional to the said voltage, and means under control of the said voltage to maintain the bandwidth of the receiver inversely proportional to the said voltage.

5. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, means under control of said voltage to maintain the duration of the transmitted pulses directly proportional to the said voltage, said pulse duration control means comprising electromagnetic means for varying the pulse duration determining impedance of the pulse generating means under control of said voltage, means under control of said voltage to maintain the repetition rate of the pulses inversely proportional to the said voltage, and means under control of the said voltage to maintain the bandwidth of the receiver inversely proportional to the said voltage.

6. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, means under control of said voltage to maintain the duration of the transmitted pulses directly proportional to the said voltage, said pulse duration control means comprising a delay line and means for varying the effective length of the said delay line under control of said voltage, means under control of said voltage to maintain the repetition rate of the pulses inversely proportional to the said voltage, and means under control of the said voltage to maintain the bandwidth of the receiver inversely proportional to the said voltage.

7. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, means under control of said voltage to maintain the duration of the transmitted pulses directly proportional to the said voltage, said pulse duration control means comprising a delay line and electromagnetic means for varying the effective length of the said delay line under control of said voltage, means under control of said voltage to maintain the repetition rate of the pulses inversely proportional to the said voltage, and means under control of the said voltage to maintain the bandwidth of the receiver inversely proportional to the said voltage.

8. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, means under control of said voltage to maintain the duration of the transmitted pulses directly proportional to the said voltage, means under control of said voltage to maintain the repetition rate of the pulses inversely proportional to the said voltage, said pulse repetition rate control means comprising means for varying the pulse repetition rate determining impedance of the pulse generating means under control of said voltage, and means under control of the said voltage to maintain the bandwidth of the receiver inversely proportional to the said voltage.

9. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, means under control of said voltage to maintain the duration of the transmitted pulses directly proportional to the said voltage, means under control of said voltage to maintain the repetition rate of the pulses inversely proportional to the said voltage, said pulse repetition rate control means comprising electromagnetic means for varying the pulse repetition rate determining impedance of the pulse generating means under control of said voltage, and means under control of the said voltage to maintain the bandwidth of the receiver inversely proportionl to the said voltage.

10. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, means under control of said voltage to maintain the duration of the transmitted pulses directly proportional to the said voltage, means under control of said voltage to maintain the repetition rate of the pulses inversely proportional to the said voltage, said pulse repetition rate control means comprising electron discharge means for varying the pulse repetition rate determining impedance of the pulse generating means under control of said voltage, and means under control of the said voltage to maintain the bandwidth of the receiver inversely proportional to the said voltage.

11. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, means under control of said voltage to maintain the duration of the transmitted pulses directly proportional to the said voltage, means under control of said voltage to maintain the repetition rate of the pulses inversely proportional to the said voltage and means under control of the said voltage to maintain the bandwidth of the receiver inversely proportional to the said voltage, said bandwidth control means comprising an amplifier including a parallel-resonance circuit across which received signals are developed, means connected in shunt with said parallel-resonance circuit, and means employing said voltage proportional to elapsed time to reduce the conductance of said shunt-connected means as the elapsed time increases.

12. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, means under control of said voltage to maintain the duration of the transmitted pulses directly proportional to the said voltage, means under control of said voltage to maintain the repetition rate of the pulses inversely proportional to the said voltage and means under control of the said voltage to maintain the bandwidth of the receiver inversely proportional to the said voltage, said bandwidth control means comprising an amplifier including a parallel-resonance circuit across which received signals are developed, rectifier means connected in shunt with said parallel-resonance circuit, and means employing said voltage proportional to elapsed time to reduce the conductance of said rectifier means as the elapsed time increases.

13. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, means under control of said voltage to maintain the duration of the transmitted pulses directly proportional to the said voltage, means under control of said voltage to maintain the repetition rate of the pulses inversely proportional to the said voltage and means under control of the said voltage to maintain the bandwidth of the receiver inversely proportional to the said voltage, said bandwidth control means comprising an amplifier including a parallel-resonance circuit across which received signals are developed, electron tube means having an anode-cathode path connected in shunt with said parallel-resonance circuit, and means employing said voltage proportional to elapsed time to reduce the conductance of said electron tube means as the elapsed time increases.

14. A pulse echo system comprising a transmitter with means to produce radiant energy in pulses of a predetermined duration and repetition rate, a receiver of controlled bandwidth producing a voltage proportional to the elapsed time between the transmission of a pulse and the reception of the echo of the pulse, said proportional voltage producing means comprising means for comparing pulses from said transmitter with the output of the receiver, means for integrating the output of said comparing means twice, means under control of said voltage to maintain the duration of the transmitted pulses directly proportional to the said voltage, said pulse duration control means comprising means for varying the pulse duration determining impedance of the pulse generating means under control of said voltage, means under control of said voltage to maintain the repetition rate of the pulses inversely proportional to the said voltage, said pulse repetition rate control means comprising means for varying the pulse repetition rate determining impedance of the pulse generating means under control of said voltage, and means under control of the said voltage to maintain the bandwidth of the receiver inversely proportional to the said voltage, said bandwidth control means comprising an amplifier including a parallel-resonance circuit across which received signals are developed, circuit means connected in shunt with said parallel-resonance circuit, and means employing said voltage proportional to elapsed time to reduce the conductance of said shunt-connected means as the elapsed time increases.

References Cited in the file of this patent

UNITED STATES PATENTS

| | | |
|---|---|---|
| 2,091,134 | Beers | Aug. 24, 1937 |
| 2,404,527 | Potapenko | July 23, 1946 |
| 2,423,024 | Hershberger | June 24, 1947 |
| 2,425,600 | Coykendall | Aug. 12, 1947 |
| 2,435,960 | Fyler | Feb. 17, 1948 |
| 2,542,983 | Beatty | Feb. 27, 1951 |
| 2,568,441 | Fyler | Sept. 18, 1951 |
| 2,606,316 | Boland | Aug. 5, 1952 |
| 2,946,050 | Wathen | July 19, 1960 |